(12) United States Patent
Just

(10) Patent No.: US 11,105,714 B2
(45) Date of Patent: Aug. 31, 2021

(54) METHOD AND APPARATUS FOR TESTING ROLLING RESISTANCE

(71) Applicant: MADAD PTY LTD, Wacol (AU)

(72) Inventor: Morrison Just, Queensland (AU)

(73) Assignee: MADAD PTY. LTD., Wacol (AU)

( * ) Notice: Subject to any disclaimer, the term of this patent is extended or adjusted under 35 U.S.C. 154(b) by 156 days.

(21) Appl. No.: 16/342,560

(22) PCT Filed: Oct. 19, 2017

(86) PCT No.: PCT/AU2017/051133
§ 371 (c)(1),
(2) Date: Apr. 17, 2019

(87) PCT Pub. No.: WO2018/071974
PCT Pub. Date: Apr. 26, 2018

(65) Prior Publication Data
US 2020/0049596 A1    Feb. 13, 2020

(30) Foreign Application Priority Data
Oct. 19, 2016   (AU) ................................ 2016904240

(51) Int. Cl.
*G01M 99/00*   (2011.01)
*G01N 19/02*   (2006.01)

(52) U.S. Cl.
CPC .......... *G01M 99/001* (2013.01); *G01N 19/02* (2013.01)

(58) Field of Classification Search
CPC .............................. G01M 99/001; G01N 19/02

USPC .................................................................. 73/7
See application file for complete search history.

(56) References Cited

U.S. PATENT DOCUMENTS

| | | | | |
|---|---|---|---|---|
| 5,538,463 A * | 7/1996 | Hasegawa | ............... | B24B 9/065 451/254 |
| 6,082,277 A * | 7/2000 | Block | .................. | D05B 11/005 112/2.1 |
| 6,131,469 A * | 10/2000 | Wortman | ............. | A47C 31/123 73/770 |
| 6,468,234 B1 * | 10/2002 | Van der Loos | .......... | A61B 5/01 128/920 |
| 6,494,076 B1 * | 12/2002 | Gent | ...................... | G01N 19/02 73/9 |
| 6,561,047 B1 | 5/2003 | Gladney et al. | | |
| 6,786,083 B1 | 9/2004 | Bain et al. | | |
| 8,875,585 B2 | 11/2014 | McCollum | | |
| 2003/0159212 A1 * | 8/2003 | Patrick | ................... | A61G 7/103 5/81.1 R |

(Continued)

OTHER PUBLICATIONS

International Search Report for International Application No. PCT/AU2017/051133, dated Jan. 2, 2018, 3 pages.

(Continued)

*Primary Examiner* — Max H Noori
(74) *Attorney, Agent, or Firm* — Edell, Shapiro & Finnan, LLC

(57) ABSTRACT

A method and apparatus for testing rolling resistance of a mattress by rolling a cylindrical weight across at least a portion of the mattress and measuring torque of the cylindrical weight moving across the mattress. The apparatus is preferably automated and preferably continuously measures torque as the cylinder is continuously moved across the mattress at a constant speed.

28 Claims, 3 Drawing Sheets

(56) References Cited

U.S. PATENT DOCUMENTS

| | | | |
|---|---|---|---|
| 2012/0024030 A1* | 2/2012 | Chen | B23P 23/02 |
| | | | 72/127 |
| 2015/0196132 A1* | 7/2015 | Duffy | G01M 99/001 |
| | | | 73/78 |
| 2015/0241332 A1 | 8/2015 | Amano et al. | |
| 2020/0064231 A1* | 2/2020 | Just | G01M 99/001 |

OTHER PUBLICATIONS

ITC Leggett & Platt International Technical Center Testing Document, published on Dec. 25, 2014 as per the Wayback Machine (found at https://web.archive.org/web/20141225224855/http://www.beddingcomponents.com:80/pdf/testing.pdf), 6 pages.

* cited by examiner

METHOD AND APPARATUS FOR TESTING ROLLING RESISTANCE

FIELD OF THE INVENTION

The invention relates to a method of testing rolling resistance of a mattress. In particular, the invention relates, but is not limited, to a method of testing and quantifying rolling resistance of a mattress by measuring the torque required to roll a weight across the mattress.

BACKGROUND TO THE INVENTION

Reference to background art herein is not to be construed as an admission that such art constitutes common general knowledge.

Mattresses are often used on bed bases, or the like, for resting and sleeping. It is fairly common for couples to sleep together on the same mattress. In such cases deflection of the mattress can cause a phenomenon known as 'roll together' whereby the weight of the users causes a depression which encourages the two users to roll together towards each other. It is generally considered as undesirable and many attempts have been made to try to overcome and prevent this phenomenon.

One characteristic which is generally considered to be desirable in preventing roll together is a resistance to rolling. In essence, this is the resistance that mattress provides to a body, such as a person, rolling on the mattress. It is, however, very difficult to objectively quantify and compare the rolling resistance of mattresses, particularly at the time of purchase where is it not possible to sleep on the mattress with a partner for any great length of time.

OBJECT OF THE INVENTION

It is an aim of this invention to provide a method of testing rolling resistance, or an apparatus for testing rolling resistance, of a mattress which overcomes or ameliorates one or more of the disadvantages or problems described above, or which at least provides a useful commercial alternative.

Other preferred objects of the present invention will become apparent from the following description.

SUMMARY OF INVENTION

In one form, although it need not be the only or indeed the broadest form, there is provided a method of testing rolling resistance of a mattress, the method comprising the steps of:
positioning a cylindrical weight on the mattress;
moving the cylindrical weight across at least a portion of the mattress; and
measuring torque of the cylindrical weight moving across the mattress.

Preferably the step of moving the cylindrical weight across at least a portion of the mattress comprises rolling the cylindrical weight across at least a portion of the mattress. Preferably the cylindrical weight is rolled at least one full revolution, even more preferably more than 1 revolution.

Preferably the step of measuring torque of the cylindrical weight comprises measuring torque created by the cylindrical weight moving across mattress. Alternatively, preferably the step of measuring torque of the cylindrical weight comprises measuring torque required to roll the cylindrical weight across the mattress.

Preferably the step of moving the cylindrical weight across at least a portion of the mattress comprises moving the cylindrical weigh using at least one actuator. Preferably the actuator is a linear actuator. Preferably the linear actuator is a hydraulic or pneumatic actuator. Alternatively the actuator may be powered electrically. The actuator may be a rotatory actuator. Preferably the actuator pushes the cylindrical weight across the mattress. Alternatively the actuator may pull the cylindrical weight across the mattress. Preferably the actuator is operatively connected to an axle of the cylindrical weight. Preferably the cylindrical weight and actuator are operatively connected such that mass distribution of the cylindrical weight remains constant as the actuator moves the cylindrical weight across at least a portion of the mattress.

Optionally the method further comprises the step of positioning a first weight, preferably a static weight, on the mattress. Preferably the first weight is a first cylinder and preferably the cylindrical weight is a second cylinder. Preferably the method comprises arranging the weighted cylinders with parallel rotational axes. Preferably the cylinders are of similar size and weight. Preferably the second cylinder positioned spaced apart from the first cylinder. Preferably the step of moving the cylindrical weight across at least a portion of the mattress comprises moving the second cylinder towards the first cylinder.

Preferably the method comprises determining any change in angle of the first weight in response to the cylindrical weight being moved across the mattress. Preferably the step of determining any change in angle of the first weight in response to the second weight being moved comprises taking a measurement using an inclinometer. Preferably the inclinometer comprises a digital protractor. Preferably the method comprises the step of zeroing the digital protractor before taking any measurements.

Preferably the step of measuring torque created by the cylindrical weight comprises measuring the output of a force gauge. Preferably the force gauge is located at an axle of the second cylinder. Preferably the forge gauge is located between the actuator and the cylindrical weight. Preferably the force gauge is a torque gauge.

Preferably the cylindrical weight is moved continuously. Preferably the step of measuring torque created by the cylindrical weight moving across the mattress comprises continuously, or at least substantially continuously, measuring the torque as the cylindrical weight is moved continuously across the mattress. Preferably the step of moving the cylindrical weight across at least a portion of the mattress comprises moving the cylindrical weight continuously at a constant speed.

Preferably the mass of at least one of the cylindrical weight and the static weight is variable. Preferably the method comprises the step of varying the mass of the weights until each weight has a predetermined mass.

Preferably the method further comprises the step of marking one or more reference lines on the mattress. Preferably a plurality of reference lines are marked on the mattress. Preferably the step of positioning a cylindrical weight on the mattress comprises positioning the cylindrical weight on a reference line on the mattress.

Preferably the step of marking one or more reference lines on the mattress comprises determining a centre line of the mattress and measuring marking at least one reference line a predetermined distance from the centre line. Preferably the step of marking one or more reference lines on the mattress comprises measuring a predetermined distance from one or more edges of the mattress and marking a reference line parallel to an edge of the mattress. Preferably the step of marking one or more reference lines on the mattress comprises marking a reference grid on the mattress.

The method may comprise automatically determining a position location of the cylindrical weight on the mattress. The method may comprise measuring cylindrical weight as it is located on the mattress. The step of moving the cylindrical weight across at least a portion of the mattress preferably comprises measuring displacement of the second weight as it is moved. Preferably the step of measuring displacement of the second weight as it is moved is performed automatically. The displacement of the second weight may be measured by measuring revolutions, including any partial revolution, of the second weight as it is rolled across the mattress.

In one form the cylindrical weight is pushed along the mattress by a drive system. In another form the cylindrical weight is pulled along the mattress by a drive system. In the latter form, the cylindrical weight is preferably operatively connected to a pair of line members that extend from the drive system. Preferably an actuator retracts the line members which in turn pulls the weighted cylinder across the mattress.

In another form, there is provided an apparatus for testing rolling resistance of a mattress, preferably carrying out the method as hereinbefore described, the apparatus comprising:
  a cylindrical weight;
  at least one actuator operatively coupled to the cylindrical weight, the actuator being configured to move the cylindrical weight across at least a portion of the mattress; and
  a force gauge configured to measure torque of the cylindrical weight moving across the mattress.

Preferably the force gauge comprises a torque gauge. Preferably the apparatus further comprises a drive system configured to move the cylindrical weight across the mattress. Preferably the drive system comprises one or more actuators. Preferably the actuators are linear actuators operatively connected to an axle of the cylindrical weight. Preferably the force gauge is configured to measure torque created by the cylindrical weight moving across the mattress. In another form the one or more actuators are preferably rotary actuators configured to drive the cylinder across the mattress. In this form the force gauge is preferably configured to measure torque required to roll the cylindrical weight across the mattress.

The drive system may be configured to push and/or pull the cylindrical weight across the mattress. The drive system may comprise a pair of line members that extend from the drive system to the cylindrical weight. The drive system may comprise an actuator configured to retract the line members which, in turn, pulls the weighted cylinder across the mattress.

Preferably the apparatus comprises a static weight. Preferably the static weight comprises an inclinometer to measure changes in angle of the static weight as the cylindrical weight is moved across the mattress. Preferably the inclinometer comprises a digital protractor. Preferably the mass of the weighted cylinders is variable. Preferably the apparatus is automated to continuously move the cylindrical weight across the mattress and to continuously, or at least substantially continuously, measure the torque created by the cylindrical weight moving across the mattress.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
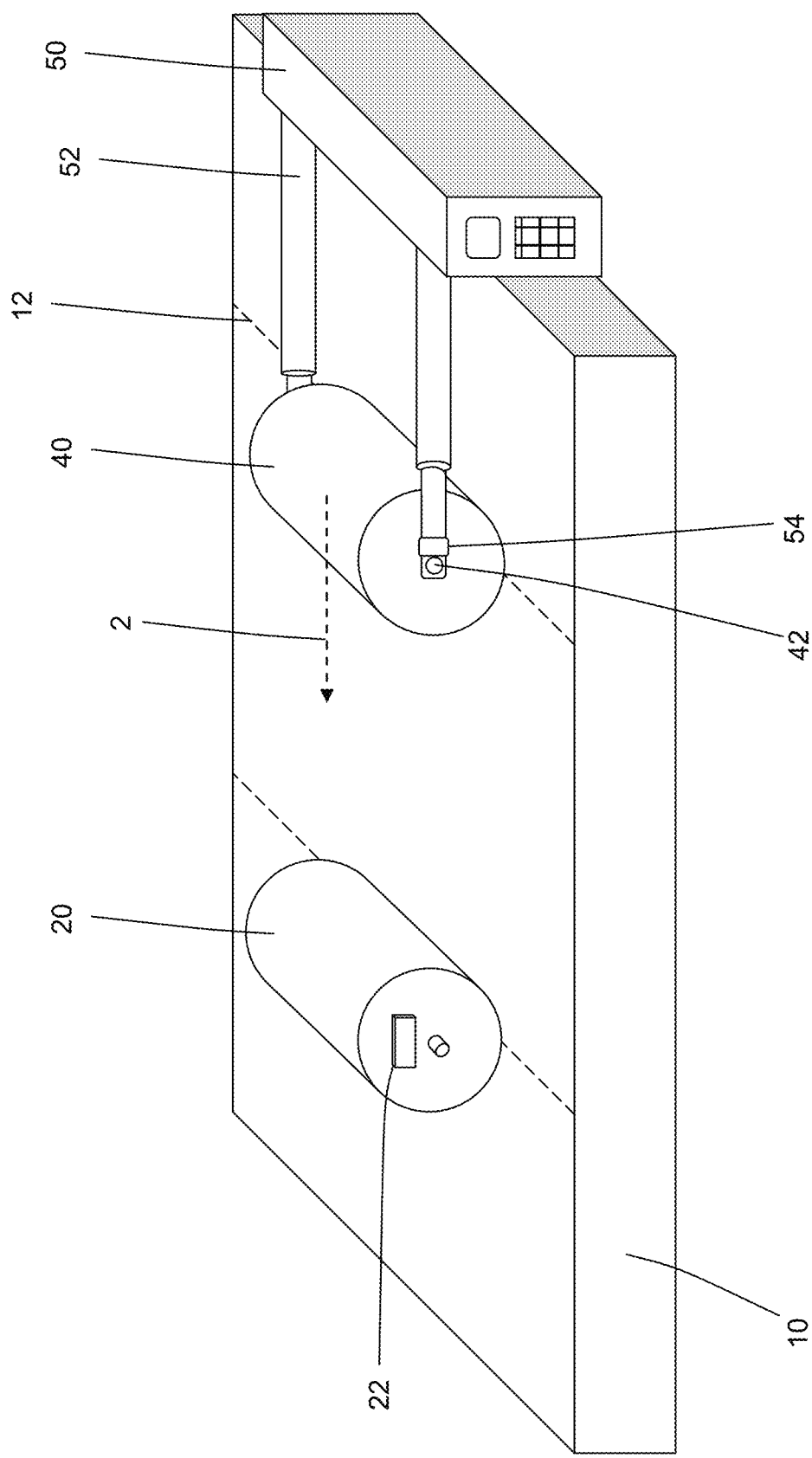
FIG. 1 illustrates a diagrammatic view of an apparatus testing rolling resistance of a mattress in a first position.
Figure 2:
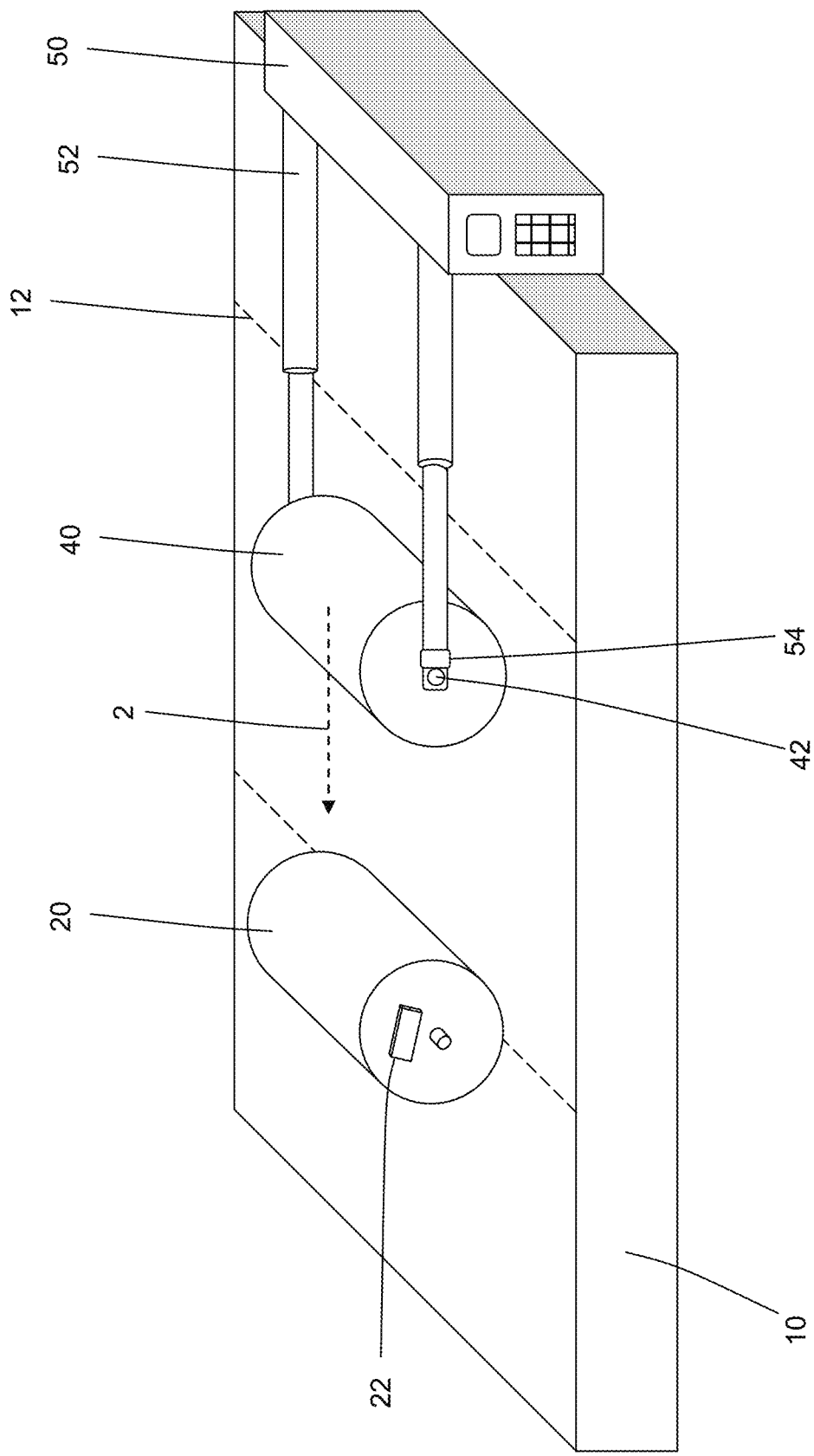
FIG. 2 illustrates a diagrammatic view of the apparatus testing rolling resistance of a mattress of FIG. 1 in a second position.

FIGS. 1 and 2 illustrate a mattress 10 having markings 12. A static weight in the form of a first weighted cylinder 20 and a cylindrical weight in the form of a second weighted cylinder 40 are positioned on top of the mattress 10 on the markings 12. A drive system 50 having actuators 52 in the form of hydraulic, pneumatic, or electric actuators operatively connected to an axle 42 of the second weighted cylinder 40. In another form (not shown) the actuators may be rotary actuators that drive the second weighted cylinder 40 across the mattress 10.

A force gauge 54 configured to measure torque created by the second weighted cylinder 40 moving across the mattress is also provided. The force gauge determines the torque, preferably in newton metres (Nm), created by the rolling resistance of the mattress on imparted to the second weighted cylinder 40 as it is moved across the mattress by the drive system 50. In the rotary actuator form, the force gauge is preferably a torque gauge that measures the torque required to roll the second weighted cylinder 40 across the mattress 10.

The first cylinder 20 has an inclinometer 22, preferably in the form of a digital protractor, mounted to an end thereof. The inclinometer 22 may be mounted to a bracket (only shown in FIG. 4) located on the end of the first cylinder 20. The inclinometer 22 is configured to measure an angle of the first cylinder 20. Although it is illustrated as being horizontal in FIG. 1, it is not strictly necessary for the inclinometer 22 to start in the horizontal position, rather it may be zeroed or have an initial reading which can be subtracted from subsequent readings to yield a relative angle measurement from an initial position to a further position.

The weighted cylinders 20, 40 preferably each weigh between 40 and 120 kgs, more preferably between 50 and 100 kgs, even more preferably between 60 and 80 kgs, and in a preferred form weigh around 70 kgs.

Figure 4:
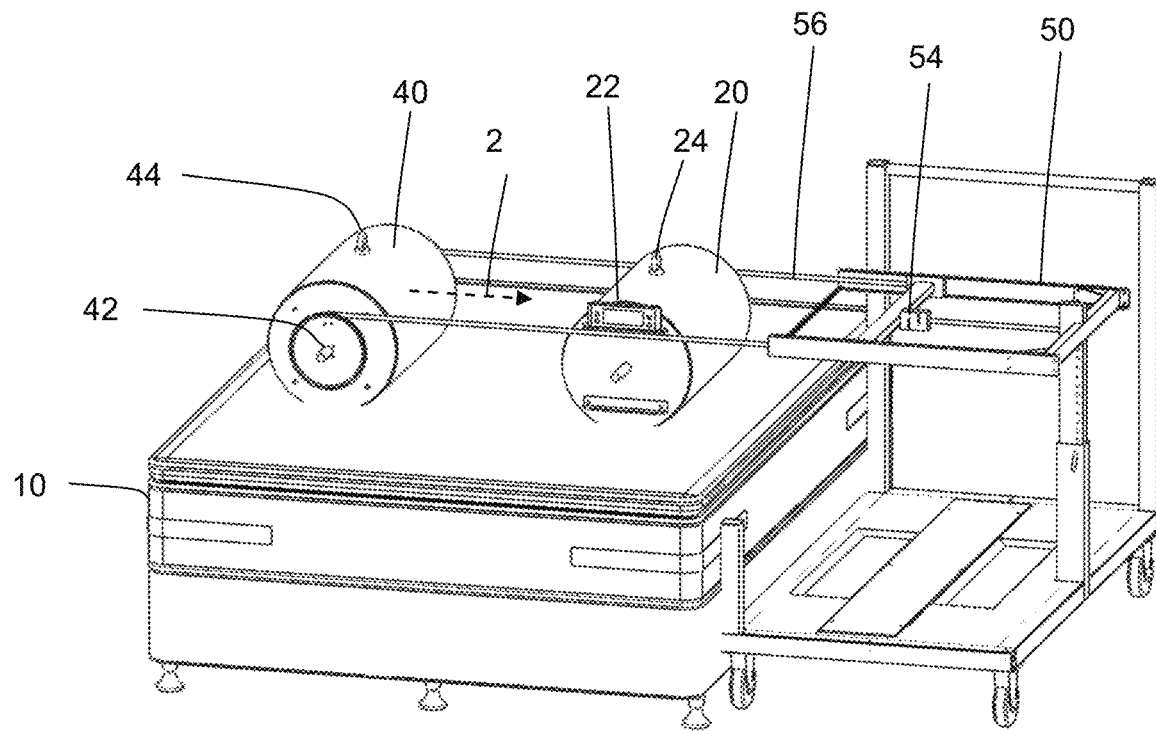
FIG. 4 illustrates a perspective view of another apparatus testing rolling resistance of a mattress.

FIG. 4 illustrates an alternative arrangement whereby the second weighted cylinder 40 is configured to be pulled towards the first weighted cylinder 20 instead of pushed. In the arrangement in FIG. 4 the second weighted cylinder 40 is operatively connected to a pair of line members 56, typically made of wire or rope, which extend from the drive system 50. The drive system has a frame that abuts the mattress 10 and an actuator retracts the line members 56 which in turn pulls the second weighted cylinder 40 in the direction indicated by arrow 2 towards the first cylinder 20.

Figure 3:
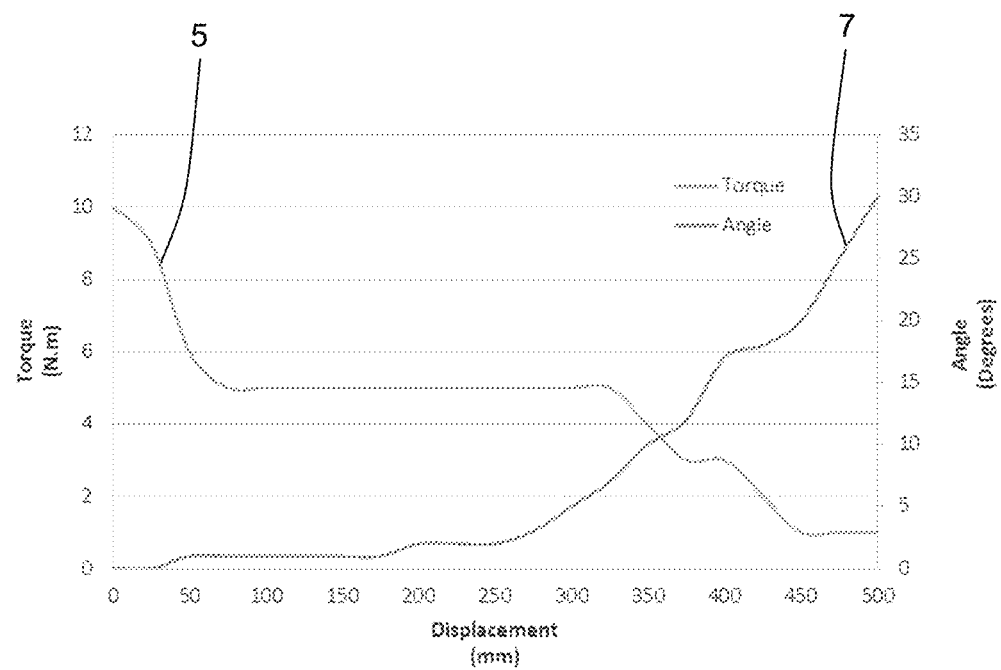
FIG. 3 illustrates a line graph showing continuous angle and torque measurements.

FIG. 3 illustrates a line graph showing torque 5 of the second cylinder 40 and angle 7 of the first cylinder 20 as the second cylinder 40 is moved continuously over 500 mm (for example purposes) of the mattress 10. Example steps undertaken to obtain the measurements illustrated in FIG. 3 are as follows.

Firstly, the mattress 10 is placed on a level supported surface. Markings 12 are then applied to the mattress 10. The markings 12 are preferably determined from a centreline of the mattress 10 and are spaced a predetermined distance from the centreline and the edges of the mattress 10. Preferably the markings form a grid, preferably with two longitudinal markings being spaced approximately 405 mm from the centreline and with two longitudinally perpendicular lines being spaced approximately 400 mm from the short ends of the mattress 12. The markings may be made by any suitable form such as, for example, marker pen or chalk.

The first cylinder 20 and second cylinder 40 may then be placed on the mattress 10. As the cylinders 20, 40 are weighted, they are typically very heavy and the assistance of a crane, or the like, may be employed to assist with locating the cylinders 20, 40 on the mattress 10. A removable anchor, such as an eye bolt 24, 44 (as seen in FIG. 4), may be affixed to the cylinders 20, 40 for the purpose of being lifted by the crane.

Once the cylinders 20, 40 are located on the mattress 10, they may be positioned on the markings 12. Specifically, the axles of each cylinder 20, 40 are preferably aligned with the markings 12. The drive system 50 is preferably removably attached to the second cylinder 40 and, accordingly, the actuators 52 of the drive system 50 are preferably connected to the axle 42 of the second cylinder 40. Optionally, the drive actuators 52 of the drive system 50 may be permanently mounted to the second cylinder 40, in which case the drive system 50 preferably includes means for lifting and locating the second cylinder 40 onto the mattress 10.

Optionally, an inclinometer 22 may be mounted to the first cylinder 20 to measure angle to simultaneously assess roll together characteristics of the mattress 10. If such roll together characteristics are not of interest, then the first cylinder 20 may not be deemed necessary. However, it is preferred to have a static weight, such as the first cylinder 20, for the second cylinder 40 to approach as outlined.

Once the cylinders 20, 40 are positioned and the second cylinder 40 is operatively connected to the actuators 52 of the drive system 50, the actuators are activated which drives the second cylinder 40 towards the first cylinder 10, as indicated by arrow 2. As the second cylinder moves across the mattress 10, the rolling resistance of the mattress 10 creates a torque in the second cylinder 20 which is measured using the force gauge 54. The movement and measurement are preferably performed simultaneously and continuously.

Once the measurements have been taken, they can then be plotted. as shown in FIG. 3, and rolling resistance characteristics of the mattress 10 can be quantified and compared with other mattresses.

Advantageously, the invention allows rolling resistance characteristics of mattresses to be quantified and compared in a repeatable, scientific manner. The method is relatively straight forward and accurately measures rolling resistance and 'roll together' characteristics. Mattresses with enhanced rolling resistance can therefore be readily identified and advertised accordingly.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A method of testing rolling resistance of a mattress, the method comprising the steps of:
    positioning a cylindrical weight on the mattress;
    positioning a static weight with an inclinometer on the mattress;
    moving the cylindrical weight across at least a portion of the mattress;
    measuring torque of the cylindrical weight moving across the mattress; and
    measuring changes in an angle of the static weight with the inclinometer as the cylindrical weight is moved across the mattress.

2. The method of claim 1, wherein the step of moving the cylindrical weight across at least a portion of the mattress comprises moving the cylindrical weigh using at least one actuator operatively connected to an axle of the cylindrical weight.

3. The method of claim 2, wherein the cylindrical weight and actuator are operatively connected such that mass distribution of the cylindrical weight remains constant as the actuator moves the cylindrical weight across at least a portion of the mattress.

4. The method of claim 1, wherein the static weight is a first cylinder and the cylindrical weight is a second cylinder, and the method comprises arranging the weighted cylinders with parallel rotational axes and the step of moving the cylindrical weight across at least a portion of the mattress comprises moving the second cylinder towards the first cylinder.

5. The method of claim 2, wherein the step of measuring torque created by the cylindrical weight comprises measuring an output of a force gauge.

6. The method of claim 5, wherein the force gauge is located at an axle of the cylindrical weight.

7. The method of claim 5, wherein the force gauge is located between the actuator and the cylindrical weight.

8. The method of claim 1, wherein the cylindrical weight is moved continuously across the mattress.

9. The method of claim 8, wherein the step of measuring torque created by the cylindrical weight moving across the mattress comprises continuously, or at least substantially continuously, measuring the torque as the cylindrical weight is moved continuously across the mattress.

10. The method of claim 8, wherein the cylindrical weight is moved continuously across the mattress at a constant speed.

11. The method of claim 1, wherein a weight of the cylindrical weight is varied until it has a predetermined mass.

12. The method of claim 1, wherein the step of moving the cylindrical weight across at least a portion of the mattress comprises measuring displacement of the cylindrical weight as it is moved.

13. The method of claim 12, wherein the displacement of the cylindrical weight is measured by measuring revolutions, including any partial revolution, of the cylindrical weight as it is rolled across the mattress.

14. The method of claim 1, wherein the cylindrical weight is pushed along the mattress by a drive system.

15. The method of claim 1, wherein the cylindrical weight is pulled along the mattress by a drive system.

16. The method of claim 15, wherein the cylindrical weight is operatively connected to a pair of line members that extend from the drive system and an actuator retracts the line members which in turn pulls the weighted cylinder across the mattress.

17. The method of claim 1, wherein the step of moving the cylindrical weight across at least a portion of the mattress comprises rolling the cylindrical weight across at least a portion of the mattress.

18. The method of claim 17, wherein the cylindrical weight is rolled at least one full revolution across the mattress.

19. An apparatus for testing rolling resistance of a mattress, the apparatus comprising:
   a cylindrical weight;
   at least one actuator operatively coupled to the cylindrical weight, the actuator being configured to move the cylindrical weight across at least a portion of the mattress;
   a force gauge configured to measure torque of the cylindrical weight moving across the mattress; and
   a static weight with an inclinometer configured to measure changes in an angle of the static weight as the cylindrical weight is moved across the mattress.

20. The apparatus of claim 19, wherein the force gauge comprises a torque gauge.

21. The apparatus of claim 19, wherein the apparatus further comprises a drive system configured to move the cylindrical weight across the mattress.

22. The apparatus of claim 21, wherein the drive system is configured to push the cylindrical weight across the mattress.

23. The apparatus of claim 21, wherein the drive system is configured to pull the cylindrical weight across the mattress.

24. The apparatus of claim 23, wherein the drive system comprises a pair of line members that extend from the drive system to the cylindrical weight.

25. The apparatus of claim 24, wherein the drive system comprises an actuator configured to retract the line members which, in turn, pulls the weighted cylinder across the mattress.

26. The apparatus of claim 19, wherein the force gauge is configured to measure torque created by the cylindrical weight moving across the mattress.

27. The apparatus of claim 19, wherein the force gauge is configured to measure torque required to roll the cylindrical weight across the mattress.

28. The apparatus of claim 19, wherein the apparatus is automated to continuously move the cylindrical weight across the mattress and to continuously, or at least substantially continuously, measure torque created by the cylindrical weight moving across the mattress.

* * * * *